US006881795B2

(12) United States Patent
Graves et al.

(10) Patent No.: US 6,881,795 B2
(45) Date of Patent: Apr. 19, 2005

(54) CO$_2$ TERMINATED RUBBER FOR PLASTICS

(75) Inventors: Daniel F. Graves, Canal Fulton, OH (US); David J. Dougherty, Akron, OH (US); Thomas A. Antkowiak, Rittman, OH (US)

(73) Assignee: Firestone Polymers, LLC, Akron, OH (US)

( * ) Notice: Subject to any disclaimer, the term of this patent is extended or adjusted under 35 U.S.C. 154(b) by 200 days.

(21) Appl. No.: 09/819,336

(22) Filed: Mar. 28, 2001

(65) Prior Publication Data

US 2002/0183468 A1 Dec. 5, 2002

(51) Int. Cl.$^7$ .................. C08F 36/06; C08F 36/14; C08F 4/46
(52) U.S. Cl. ............... 525/331.9; 525/333.2; 526/173; 526/335; 526/337
(58) Field of Search ............... 525/331.9, 333.2; 526/173, 335, 337

(56) References Cited

U.S. PATENT DOCUMENTS

| | | | |
|---|---|---|---|
| 3,070,579 A | | 12/1962 | Szwarc |
| 3,109,871 A | | 11/1963 | Zelinski et al. |
| 3,135,716 A | | 6/1964 | Uraneck |
| 3,349,071 A | | 10/1967 | Strobel |
| 3,451,988 A | | 6/1969 | Langer |
| 3,791,888 A | * | 2/1974 | Hudson |
| 4,075,186 A | | 2/1978 | Ambrose |
| 4,096,254 A | | 6/1978 | Benson |
| 4,329,439 A | | 5/1982 | Lohr, Jr. |
| 4,399,260 A | * | 8/1983 | Carson ............... 525/340 |
| 4,417,029 A | * | 11/1983 | Milkovich ........... 525/314 |
| 4,503,188 A | | 3/1985 | Mannicelli |
| 4,518,753 A | * | 5/1985 | Richards et al. ...... 549/513 |
| 4,555,547 A | | 11/1985 | Ueda et al. |
| 4,555,548 A | | 11/1985 | Ueda et al. |
| 4,614,771 A | | 9/1986 | Watanabe et al. |
| 4,616,069 A | | 10/1986 | Watanabe et al. |
| 4,647,625 A | | 3/1987 | Aonuma et al. |
| 4,753,991 A | | 6/1988 | Bronstert |
| 4,970,254 A | | 11/1990 | Willis et al. |
| 5,063,190 A | * | 11/1991 | Hargis et al. |
| 5,376,745 A | | 12/1994 | Handlin, Jr. |
| 5,395,902 A | | 3/1995 | Hall |
| 5,610,227 A | | 3/1997 | Antkowiak et al. |
| 5,612,435 A | | 3/1997 | Bening et al. |
| 5,728,782 A | | 3/1998 | Brady et al. |
| 5,739,254 A | | 4/1998 | Fuller et al. |
| 5,792,824 A | | 8/1998 | Natori |
| 5,814,709 A | | 9/1998 | De Boer et al. |
| 5,827,927 A | | 10/1998 | Gagnéet al. |
| 5,844,050 A | | 12/1998 | Fukahori et al. |
| 5,902,856 A | | 5/1999 | Suzuki et al. |

FOREIGN PATENT DOCUMENTS

DE 2003128 7/1971
EP 0 588 287 A2 3/1994
EP 1 072 613 A1 1/2001

OTHER PUBLICATIONS

Hayashi et al., Journal of Polymer Science: Part A, vol. 2, pp 2571–2594 (1964) Glycols and Dicarboxylic Acids from Butadiene, Isoprene, and Styrene and Some Derived Block Polymers, Esters and Urethans.
Wyman et al., Journal of Polymer Science: Part A., vol. 2, pp 4545–4550 (1964), Reaction of Polystyryllithium with Carbon Dioxide.
P. Mansson, Journal of Polymer Science Pol. Chem. 2d., pp. 1945–1956 (1980), Reactions of Polystyrl Anions with Carbon Dioxide and Oxygen. Analysis of Products by Silica Gel Chromatography,.
Quirk, Roderic P., Chen, Wei–Chih, Markromol Chem. 183, pp. 2071–2076 (1982), Functionalization of Polymeric Organolithium Compounds Carbonation.
Halasa, Adel F., Tate, David P., Abstract–Elastomers, vol. 85 (1976), p. 55, Process for Polylithiating Unsaturated Polymers.
Abstract—Plastic Manual, vol. 121, (1994), p. 65, Olefin Polymers Having a Carboxyl Group on One End and Manufacture Thereof.
Abstract—Synthetic High Polymers, vol. 117, (1964), p. 19, Melt–metalation of Block Copolymers.
Abstract—Plastics Fabr. Uses, vol. 107, (1987), p. 53, Modified Block Copolymers and Impact–Resistant Compositions.
Abstract—Synthetic High Polymers, vol. 114 (1991), p. 19, Functionalized Polymers from Unsaturated Diene–styrene Copolymers by Hydrogenation and Reaction with Functionalizing Agent.
Abstract—Plastics Manual, vol. 111 (1989), p. 67, Impact–Resistant Blends of Polar Thermoplastic Polymers and Modified Block Copolymers.
Abstract—Plastics Manual, vol. 87, (1977), p. 37, Manufacture of Telehelic Polymers.
Balleyer, Windried, Goetz, Reiner, Griehl, Volker, Stubenrauch, Dieter, Abstracts—Synthetic High Polymers, vol. 95, p. 170132 (1981), Carboxylation of "Living" Polymers.
Harada, K., Ishikawa, K. , Komatsu, Koei, Honma, T., Abstract—Synthetic High Polymers, vol. 81, p. 26292, (1974), Carboxylation of Polymers Having Alkali Metal Atom at End Groups.
BDPF (listed as author), Abstract—Rubber and Other Elements, vol. 65, p. 17178, 1966, Butadiene Polymers.
Abstract—115: 72522n Functionalization of Polymeric Organolithium Compounds by Carbonation, Apr. 18, 1991.
Abstract—110: 8848t Block Copolymer Grafting Process for Preparing Elastomers Containing Functional Groups, Jul. 20, 1988.

* cited by examiner

*Primary Examiner*—Caixia Lu
(74) *Attorney, Agent, or Firm*—Scott A. McCollister

(57) ABSTRACT

A process for the manufacture of a baleable lithium carboxylate polymer. The process includes polymerizing at least one conjudated diene in the presence of an organolithium initiator to a substantial completion. Thereafter, the polymerization process is terminated by the addition of carbon dioxide.

20 Claims, No Drawings

CO$_2$ TERMINATED RUBBER FOR PLASTICS

FIELD OF INVENTION

The present invention relates to polymerization of monomers and to the use of the resultant polymers as additives in other polymeric systems. More particularly, this invention relates to a process of polymerizing vinyl compounds and, more specifically, a method of terminating the polymerization process to produce a compound having high bulk viscosity, but low solution viscosity.

BACKGROUND OF THE INVENTION

Certain engineered plastics, such as styrene-maleic anhydride copolymers (SMA's) and high impact polystyrenes (HIPS), are prepared in the presence of a rubber, for example, a polybutadiene or a styrene-butadiene copolymer, to enhance toughness, impact strength and other properties. A low solution viscosity additive rubber can facilitate the dispersion of the rubber in the plastic phase. Moreover, early in polymerization of HIPS, phase separation begins because of the immiscibility of the rubber within the polystyrene being formed and depletion of the styrene phase. Furthermore, in SMAs, a low solution viscosity may improve the clarity and the gloss of the resultant product.

While low solution viscosity of the additive rubber is highly desirable, it makes commercial handling difficult. Moreover, low solution viscosity typically leads to a liquid or semi-liquid material that is difficult to package and ship. Accordingly, a relatively high bulk viscosity material capable of being baled into a shippable and easy to handle form is desirable.

Significant work has been conducted in the art of polymerizing vinyl compounds, particularly conjugated dienes. However, there has been no suggestion to use the present inventive polymerization technique for termination of the reaction to achieve a high bulk viscosity, low solution viscosity rubber compound.

The present invention uses CO$_2$ termination of the polymerization process to yield a highly desirable product. Importantly, while the use of CO$_2$ termination of polymerization has been utilized before, CO$_2$ reaction termination has previously been performed to provide a reactive product by the immediate protonation or other activation of the polymeric material. For example, U.S. Pat. No. 3,070,579 teaches reacting a living polymer, i.e., a polymerizable chemo-aromatic hydrocarbon having reactive negatively charged end groups, with a compound such as a CO$_2$, CS$_2$, 1,2-propylene oxide or ethylene oxide while having the reactants dissolve in a liquid. The patent further states that because of the reactive end groups, the bifunctional polymeric product is reacted with other groups or compounds to form many compositions.

The present invention advantageously provides a low molecular weight carboxylated polymeric material having a bulk viscosity particularly suitable for addition to SMA or HIPS resins.

SUMMARY OF THE INVENTION

The present invention provides a method of forming a low solution viscosity, lithium carboxylate polymer including monomer units of vinyl compounds. Generally, the process includes polymerizing at least one conjugated diene in the presence of an organolithium initiator substantially to completion and terminating the reaction via the addition of CO$_2$. The combination of steps in the present process provides terminating living anionic polymers with CO$_2$, leaving the polymer chain end as a lithium carboxylate (P-COO$^-$Li$^+$). In contrast to prior CO$_2$ termination processes, the present invention does not protonate nor further react the resultant polymer. Rather, the present invention advantageously seizes on the advantages of using a high bulk viscosity, low solution viscosity rubber as demonstrated by the carboxylate form of the material. The resultant product is a rubbery material with high bulk viscosity e.g. Mooney Viscosity above about 45, preferably above about 60, and good resistance to cold flow. Solutions of the rubbery material, in monomers used to form plastic resin, are generally low in solution viscosity, e.g. below about 75 cP, preferably below about 50 cP, most preferably below about 45 cP. The low solution viscosity provides higher gloss and allows greater rubber content to equivalent power levels.

DETAILED DESCRIPTION OF ILLUSTRATIVE EMBODIMENTS

The present invention is directed to the development of low solution viscosity, high bulk viscosity polymer systems. These polymers are preferably homopolymers of conjugated dienes terminated with carboxylate groups. To form these polymers, conjugated dienes are polymerized in the presence of an organometallic initiator in a solvent.

The polymerization is carried out by living anionic polymerization, and the polymerization is terminated by the addition of CO$_2$ groups. Living polymerizations are polymerizations in which propagating centers do not undergo either termination or transfer. After 100% conversion is reached, additional polymerization takes place by adding more monomer to the reaction system. The added monomer is also polymerized quantitatively. Such polymerizations offer the potential for producing structures with defined end groups and block copolymers.

Although conjugated diene homopolymers are preferred products, conjugated diene copolymers may also be highly desirable where the comonomers impart desirable properties and do not detract from the polymer properties. The comonomers may be vinyl arenes, including vinyl aromatic hydrocarbons having alkyl, aralkyl, or cycloalkyl groups attached to the aromatic nucleus and preferably having no more than 20 carbon atoms. Typical of these aromatic comonomers are styrene, α-methyl styrene, vinyl toluene, ethyl styrene, p-cyclohexyl styrene, vinyl naphthalene, vinyl ethyl naphthalene, vinyl methyl naphthalene, vinyl butyl naphthalene, vinyl diphenyl, vinyl diphenylethane, 4-vinyl-4'-methyldiphenyl, and the like. Preferably, such comonomers have no more than 20 carbon atoms. Where such comonomers are to be used, generally at least 1%, preferably at least 5% by weight should be used and as much as 60%, preferably no more than 30% of the comonomer may be used.

A high vinyl content in the carboxylate terminated conjugated diene homo- or co-polymers might be desired. Suitable 1,2-vinyl modifiers may be added to the polymerization mixture to increase the vinyl content to as high as 90% of the conjugated diene monomer units. Exemplary 1,2-vinyl modifiers include one or more of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, tri-ethyl amine, N,N-dimethyl aniline, N-ethylpiperidine, N-methyl-N-ethyl aniline, and N-methylmorpholine.

One effective catalyst system for living anionic polymerizations is a hydrocarbyl lithium. Hydrocarbyl lithium compounds may be represented by the formula $R^1Li$ wherein $R^1$ is a $C_1$–$C_{20}$ hydrocarbyl radical, advantageously a $C_{1-C20}$ aliphatic radical, preferably, $C_3$–$C_6$, but may also be $C_6$–$C_{20}$ cycloaliphatic or aromatic, preferably $C_6$–$C_{12}$. Preferred $R^1Li$ compounds are n-butyl and sec-butyl lithium. Other suitable $R^1Li$ compounds include but are not restricted to those in which the $R^1$ groups are ethyl, n-propyl, isopropyl, n-amyl, sec-amyl, sec-hexyl, n-hexyl, octyl, nonyl, decyl, dodecyl, octadecyl, phenyl, tolyl, dimethyl-phenyl, ethylphenyl, naphthyl, cyclohexyl, methylcyclohexyl, ethylcyclohexyl, cycloheptyl, allyl, 2-butenyl, 2-methyl butenyl, cyclopentylmethyl, methylcyclopentylethyl, phenylethyl, cyclopentadieneyl, naphthyl, phenylcyclohexyl, etc. Generally, the catalyst is used in a proportion of about 0.15–20 mmol of initiator per 100 g of monomer.

The polymerization is advantageously conducted in a solvent. Hexane is preferred as well as other $C_3$–$C_{20}$ alkanes, preferably $C_5$–$C_{10}$ alkanes, such as butane, pentane, heptane, octane, nonane, decane, etc. However, other non-aromatic hydrocarbon solvents such as cycloalkanes, e.g., cyclohexane, methylcyclohexane, cycloheptane, etc., may also be used. $C_6$–$C_{20}$ cycloalkanes are preferred, more preferably $C_5$–$C_{10}$. Toluene and other aromatics may act as telomerizing agents and thereby reduce the average molecular weight of the product. However, where this is not critical, aromatic solvents may be used. Advantageously, a butadiene concentration of about 15–50% is desirable, preferably about 20–25%.

In the catalyst system and polymerization process, the standard precautions against contamination of an organometallic system with impurities such as water, air, etc., which deactivate or reduce the efficiency of the system should be taken. Consequently, the solvent, reagents, reactor and atmosphere in the reactor area are treated accordingly to avoid such contaminants. Advantageously, less than 25 ppm, preferably less than 5 ppm, of water is present during polymerization.

The polymerizations can be conducted in autoclaves, pressurized reactors or bottles capable of withstanding the pressures generated at the temperature used. Preferably, the pressures will be in a range of about 34–760 kPa, more preferably between about 200 and 700 kPa. Temperatures are preferably between about room temperature to about 120° C., more preferably between about 30 and 100° C.

While a substantial amount of polymerization is effected within one hour, additional polymerization can be effected at longer residence times, e.g. three hours. However, generally 6 hours or more are desired for greater yields, and while polymerization is generally substantially completed within 16 hours, depending on the temperature, there is no harm or adverse result in allowing polymerization to continue 70 hours or more.

When polymerization is completed, the catalyst is deactivated by the addition of a small amount of $CO_2$, which is preferably added in an amount of at least about ½, up to more than 1, molar equivalent of lithium initiator. The $CO_2$ terminates the living polymer chains, resulting in carboxylate end groups on most of the polymer chains. It is added to the polymerization mixture by bubbling through in a gaseous form. The $CO_2$ then reacts with the reactive end groups of the living polymer chains to effectively end the living polymerization. The resulting polymer has carboxylate end groups which are stabilized by the $Li^+$ initiator residues present in the polymerization mixture along with some undesired covalently coupled polymer chains.

A small amount of antioxidant, such as di-t-butyl cresol is preferably added to the polymer product. The antioxidant is preferably added in an amount less than 4 weight percent, more preferably less than 2 wt. % of the total solution. The polymer can be recovered and dried before processing, preferably by drum drying at an appropriate temperature for evaporation of remaining solvent. Alternatively, a steam desolventization method is used to recover the polymer product.

The number average molecular weight ($M_n$) of the carboxylate terminated polymer product is advantageously in the range of about 100,000 to 300,000, preferably about 150,000 to 250,000. Furthermore, narrow molecular weight ranges may be desired for specific properties. Molecular weights reported herein are determined by Dilute Solution Viscosity (DSV).

Other polar additives, such as maleic anhydride can be added to decrease solution viscosity if so desired. In addition, additives such as tetramethyl ethylene diamine, 2-ethylhexanoic acid, acetonitrile, and mixtures thereof may be added to the rubbery polymer composition to further improve the solution viscosity. The precipitated product can be filtered and washed with more alcohol and finished by addition of suitable stabilizers and inhibitors followed by drying according to methods known in the polymer field. If desired, the product may be extracted with acids, bases, complexing agents, etc., to reduce catalyst residues to a low level prior to the addition of stabilizers or inhibitors.

After formation, the rubbery polymer is then advantageously mixed with other polymer systems such as HIPS, SMAs, or acrylonitrile styrene butadiene copolymers (ABS). These polymer systems are reinforced by the addition of rubbers such as those of the present invention.

EXAMPLES

Example 1

Increased Bulk Viscosities Via $CO_2$ Termination

Mooney viscosities (bulk viscosity measurement) were determined for different living polymers which were split in two and terminated with a proton source ($H^+$ from water or isopropanol) or $CO_2$:

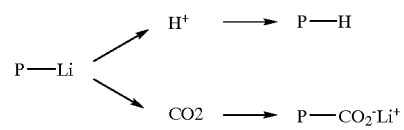

As can be seen in Table 1, $CO_2$ termination, followed by antioxidant additives and drying showed significantly increased bulk viscosity.

TABLE 1

Mooney Viscosities

|  | $M_w$ | Mooney Viscosity with H$^+$ Termination | Mooney Viscosity with CO$_2$ Termination |
|---|---|---|---|
| Polybutadiene | 151 K | 23.7 | 112.2 |
| Polybutadiene | 163 K | 35.8 | 94.0 |
| Butadiene/styrene copolymer | 160 K | 27.5 | 60.5 |
| Butadiene/styrene copolymer | 18 K | 40.5 | 75.9 |

In each of these examples, the CO$_2$ was added to the polymerization mixture to terminate the polymerization. Following the CO$_2$ addition, an antioxidant was added to precipitate the polymer product and the product was drum dried.

Example 2

Solution Viscositites of P-CO$_2$Li with Additives

A living polybutadienyl lithium was treated with CO$_2$ and this P-CO$_2$⁻Li$^+$ was dissolved in toluene for solution viscosity determinations (in toluene). Various additives were also added to further reduce solution viscosity.

| Solution Viscosity (cP) | Additive (amount)* |
|---|---|
| 92.8 | none |
| 26.8 | maleic anhydride (10%) |
| 27.1 | maleic anhydride (5%) |
| 27.5 | maleic anhydride (1%) |
| 89.4 | none |
| 93.5 | none |
| 92.0 | isopropanol (1.5%) |
| 67.9 | tetramethyl ethylene diamine |
| 29.5 | 2-ethylhexanoic acid (1.5%) |
| 92.5 | acetonitrile (1.5%) |

*% based on weight of polymer

As seen in the above examples, additives such as maleic anhydride or carboxylic acids like 2-ethylhexanoic acid work cooperatively with the CO$_2$ terminated polybutadiene to significantly decrease solution viscosities. Similar results were observed for solutions of these rubbery polymers in a monomer such as styrene.

Example 3

CO$_2$ Terminated-Continuously Polymerized Polybutadiene

A living lithium high vinyl polybutadiene was treated with CO$_2$ with the following results:

| | |
|---|---|
| Mooney if H$^+$ terminated | 13 |
| Mooney if CO$_2$ terminated | 46 |
| Solution Viscosity after CO$_2$ | 119 cP |
| Solution Viscosity after CO$_2$ treatment and addition of maleic anhydride | 72 cP |

Comparative Example:

| | |
|---|---|
| H$^+$ terminated polybutadiene (Mooney Viscosity) | 35 |
| H$^+$ terminated polybutadiene (solution viscosity) | 97 cP |

The H$^+$ terminated polybutadiene used in the comparative examples was a medium-vinyl, unmodified polybutadiene with a $M_w$ of about 200,000, and was obtained from Firestone Polymers, Inc.

Various modifications and alterations that do not depart from the scope and spirit of this invention will become apparent to those skilled in the art. This invention is not to be unduly limited to the illustrative embodiments set forth herein.

We claim:

1. A process for the manufacture of a baleable carboxylate terminated polymer comprising polymenzing at least one conjugated diene in the presence of an organolithium initiator substantially to completion and terminating the polmerization by adding carbon dioxide so as to provide said carboxylate terminated polymer, wherein said carboxylate terminated polymer has a bulk viscosity of greater than 45 and a solution viscosity of less than 75 cP.

2. The process of claim 1 wherein said conjugated diene is selected from the group consisting of 1,3-butadiene, isoprene, 2,3-dimethyl-1,3-butadiene, 1,3-pentadiene, and mixtures thereof.

3. The process of claim 1 further comprising copolymerizing additional monomers including vinyl aromatic hydrocarbons and alkenes with said conjugated diene.

4. The process of claim 1 wherein said carbon dioxide is added in an amount of at least about 0.5 a molar equivalent of said organolithium initiator.

5. The process of claim 1 wherein said carbon dioxide is added in an amount greater than the amount of said organolithium initiator.

6. The process of claim 1 wherein said carboxylate terminated polymer is further added to a HIPS or SMA resin.

7. The process of claim 1 wherein a polar compound is added to said carboxylate terminated polymer.

8. The process of claim 1 wherein the polymerization is continuous.

9. The process of claim 7 wherein said polar compound is selected from maleic anhydride, tetramethyl ethylene diamine, 2-ethylhexanoic acid, and mixtures thereof.

10. The process of claim 1 wherein the carboxylate terminated polymer has a number average molecular weight of from about 100,000 to 300,000.

11. The process of claim 10 wherein the carboxylate terminated polymer has a number average molecular weight of from about 150,000 to 250,000.

12. The process of claim 1, wherein said carboxylate terminated polymer is suitable for use as an impact modifier in HIPS and SMA resins.

13. The process of claim 3, wherein said vinyl aromatic hydrocarbons are selected from the group consisting of are one or more of styrene, α-methylstyrene, vinyl toluene, ethyl styrene, vinyl naphthalene, vinyl ethylnapthalene, vinyl methyl naphthalene, vinyl butyl naphthalene, vinyl diphenyl, vinyl diphenylethane, 4-vinyl-4'-methyldiphenyl, and combinations thereof.

14. The process of claim 1, wherein said organolithium initiator is a hydrocarbyl lithium.

15. The process of claim 14, wherein said hydrocarbyl lithium is n-butyl lithium.

16. The process of claim 3, wherein said comonomers comprise from 5% to 30% by weight of said carboxylate terminated polymer.

17. The process of claim 1, wherein a vinyl modifier is added to increase the vinyl content of the conjugated diene units in said carboxylate terminated polymer.

18. The process of claim 17, wherein said vinyl modifier is selected from the group consisting of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, and N-methylmorpholine and mixtures thereof.

19. The process of claim 1, wherein a polar additive is added to decrease solution viscosity of the resulting carboxylate terminated polymer.

20. The process of claim 19, wherein said polar additive is selected from the group consisting of maleic anhydride, tetramethyl ethylene diamine, 2-ethylhexanoic acid, acetonitrile, and mixtures thereof.

\* \* \* \* \*

UNITED STATES PATENT AND TRADEMARK OFFICE
CERTIFICATE OF CORRECTION

PATENT NO.    : 6,881,795 B2
DATED         : April 19, 2005
INVENTOR(S)   : Daniel F. Graves et al.

It is certified that error appears in the above-identified patent and that said Letters Patent is hereby corrected as shown below:

<u>Column 6,</u>
Line 19, please delete the word "polymenzing" and replace it with -- polymerizing --.

Signed and Sealed this

Twenty-third Day of August, 2005

JON W. DUDAS
*Director of the United States Patent and Trademark Office*